United States Patent
Hillyard

(10) Patent No.: US 9,462,469 B2
(45) Date of Patent: Oct. 4, 2016

(54) SYSTEMS AND METHODS FOR SHORT RANGE WIRELESS DATA TRANSFER

(71) Applicant: Jason Edward Robert Hillyard, San Diego, CA (US)

(72) Inventor: Jason Edward Robert Hillyard, San Diego, CA (US)

(73) Assignee: ARM LIMITED, Cambridge (GB)

( * ) Notice: Subject to any disclaimer, the term of this patent is extended or adjusted under 35 U.S.C. 154(b) by 136 days.

(21) Appl. No.: 14/258,007

(22) Filed: Apr. 21, 2014

(65) Prior Publication Data

US 2015/0304843 A1    Oct. 22, 2015

(51) Int. Cl.
| | |
|---|---|
| H04L 29/06 | (2006.01) |
| H04W 12/06 | (2009.01) |
| H04W 4/00 | (2009.01) |
| G06F 9/54 | (2006.01) |
| G06F 9/445 | (2006.01) |

(52) U.S. Cl.
CPC .............. *H04W 12/06* (2013.01); *G06F 8/665* (2013.01); *G06F 9/546* (2013.01); *H04W 4/008* (2013.01)

(58) Field of Classification Search
CPC .............................. H04W 12/06; H04W 4/008
See application file for complete search history.

(56) References Cited

U.S. PATENT DOCUMENTS

| | | | | |
|---|---|---|---|---|
| 6,108,707 A * | 8/2000 | Wiese | ................. | H04L 12/5693 709/213 |
| 6,438,586 B1 * | 8/2002 | Hass | ...................... | G06F 9/544 709/213 |
| 7,133,897 B1 | 11/2006 | Tran | | |
| 9,135,429 B2 * | 9/2015 | Moosavi | ................. | G06F 21/44 |
| 2004/0190038 A1 * | 9/2004 | Shahindoust | ........... | G07F 17/26 358/1.14 |
| 2010/0088297 A1 | 4/2010 | Kiilerich et al. | | |
| 2010/0131414 A1 * | 5/2010 | Tame | ..................... | G06F 21/32 705/67 |
| 2010/0178871 A1 | 7/2010 | House | | |
| 2011/0313922 A1 | 12/2011 | Ben Ayed | | |
| 2013/0017816 A1 | 1/2013 | Talty et al. | | |
| 2013/0145057 A1 | 6/2013 | Rathi et al. | | |
| 2014/0020073 A1 | 1/2014 | Ronda et al. | | |
| 2015/0332258 A1 * | 11/2015 | Kurabi | ................. | G06Q 20/382 705/71 |

FOREIGN PATENT DOCUMENTS

WO    WO 2013/006315    1/2013

* cited by examiner

*Primary Examiner* — Shawnchoy Rahman
(74) *Attorney, Agent, or Firm* — Leveque Intellectual Property Law, P.C.

(57) ABSTRACT

Systems and methods for application level authentication are provided for use with the low energy Bluetooth device and accessory. This includes receiving accessory credentials from a server, establishing a Bluetooth low energy connection with the accessory, authenticating with the accessory, and lastly transferring data to the accessory. The transferring of the data may be either a bulk transfer, or a data stream. The authenticating may be an application layer authentication between a device and the accessory using a shared secret key and using a hash function. Additional embodiments include methods for over-the-air firmware updates, and device control of a low energy Bluetooth accessory.

8 Claims, 13 Drawing Sheets

SYSTEMS AND METHODS FOR SHORT RANGE WIRELESS DATA TRANSFER

BACKGROUND

This invention relates generally to systems and methods for short range wireless data transfers. Such systems and methods enable new classes of low cost, low energy accessories that have the ability to get firmware updates, or other data transfers while still complying with Bluetooth low energy (BLE) standards.

Bluetooth low energy is an international open standard for low power short range wireless communication. BLE enables low power devices that have extended battery life, and are thus ideally suited for small accessories where power availability is at a premium, such as wireless watches, proximity key fobs, fitness sensors, etc.

However, current Bluetooth low energy protocols do not have the needed ability to perform extended data transfers, and particularly do not have functionality to perform firmware upgrades. Instead, they were designed for reading and writing small, discrete data values. For very basic accessory devices, this is not of concern since the firmware tends to remain static; however, as accessory products become more complex, the embedded firmware correspondingly becomes more complex. With this increase in firmware complexity, the chance that updates are needed multiplies. This is particularly true when the accessory communicates with a mobile device, such as a tablet or cell phone, where the operating system version changes on a near continual basis, and thereby potentially impacting device to accessory interoperability.

In addition to data transfer needs for bulk, continuous transfers, and firmware updating, BLE accessory devices often have other communication protocol needs that require special solutions to improve performance and interoperability. Many accessories need special "device control" features. Examples of device control features: configuring connection parameters, setting the connection security level, or disconnecting a connection.

Although these three device control examples given above could be performed with standard procedures defined by the Bluetooth specification, there is still a need for special solutions defined at the application level. This is because mobile phone operating systems often limit the access apps have to these standard device control procedures. For example, iOS does not allow an app to set the security level of a connection.

Moreover, the Bluetooth specification defines the standard protocols and procedures for establishing a secure connection between two BLE devices. In a secure connection the data transferred between BLE radios is encrypted. Two devices are considered to be "bonded" when they have established and stored an encryption key used for secure communication.

Although this standard bonding security procedure is beneficial, it also has drawbacks. The process of bonding requires user interaction; the mobile phone OS will generally prompt the phone user with a popup message asking if it is ok to bond. If an accessory is used with multiple phones the accessory must bond separately with each phone, and bonding information must be stored in non-volatile memory for each bonded phone. An accessory also needs the ability to delete a bond; however since most accessory devices lack sophisticated user interfaces it may be impossible to select and delete the bond for a particular phone. Clearly there is a need for a more sophisticated application level authentication and encryption protocols.

It is therefore apparent that an urgent need exists for systems and methods short range wireless data transfers which comport to Bluetooth low energy standards to enable the bulk or streaming transfer of data to an accessory, firmware updates, authentication and encryption on the application level, and special control protocols. Such systems and methods enable firmware updates and other data transfers to classes of devices that currently do not have this level of functionality. This enables BLE accessories to continue their interoperability even when the device they are in communication with devices that have changed their operating system.

SUMMARY

To achieve the foregoing and in accordance with the present invention, systems and methods for short range wireless data transfers. Such systems and methods enable new classes of low cost, low energy accessories that have the ability to get firmware updates, or other data transfers while still complying with Bluetooth low energy (BLE) standards.

In some embodiments, a method for application level authentication is provided for use with the low energy Bluetooth device and accessory. This method includes receiving accessory credentials from a server, establishing a Bluetooth low energy connection with the accessory, authenticating with the accessory, and lastly transferring data to the accessory. The transferring of the data may be either a bulk transfer, or a data stream. The authenticating may be an application layer authentication between a device and the accessory using a shared secret key and using a hash function.

In some cases, an application on a device receives the accessory credentials and authenticates with the accessory without the device operating system's involvement. The method may also include defining a file transfer control message for a device to get and put data from and to the accessory, and defining separate channels for communicating the file transfer control messages and the transfer data. The length of the get or put operation may also be defined. The transferred data may be verified for completion and correctness.

Additional embodiments include methods for over-the-air firmware updates for low energy Bluetooth accessories. The over-the-air firmware updates include reading accessory information, authenticating with the accessory (as described above), initiating a diagnostic mode in the accessory, transferring firmware update data to the accessory, verifying the data transfer, and disconnecting from the accessory which triggers a reset of the accessory.

Additional embodiments include methods for device control of a low energy Bluetooth accessory. Device control includes the steps of sending a device control message from a device application to an accessory application, and receiving a response at the device application for the control message. The device control message may be a parameter update request.

The method may also include forming a communication channel between a device Bluetooth low energy stack and an accessory Bluetooth low energy stack. The communication channel is a standard Bluetooth low energy connection parameter update. In some cases, the parameter update request causes the accessory application to send a connection parameter update to the accessory Bluetooth low energy stack. The response is a device control message received from the accessory application including current connection parameters.

The device control message may also be a get ATT MTU operation. The ATT MTU operation causes the accessory application to send a get ATT MTU request to the accessory Bluetooth low energy stack. The response is a device control message received from the accessory application including current ATT MTU value.

The device control message may also be a security request. In this case a communication channel between a device Bluetooth low energy stack and an accessory Bluetooth low energy stack is formed which is a standard Bluetooth low energy pairing procedure. The device Bluetooth low energy stack confirms pairing with the device application. The security request causes the accessory application to send a security request message to the accessory Bluetooth low energy stack. The response is a device control message received from the accessory application including connection security level.

The device control message may also be a service change inquiry. A communication channel between a device Bluetooth low energy stack and an accessory Bluetooth low energy stack is formed, which is a standard Bluetooth low energy discovery procedures. The service change inquiry causes the accessory application to send a service change message to the accessory Bluetooth low energy stack, and subsequently a service change indication from the accessory Bluetooth low energy stack to the device Bluetooth low energy stack. The response is discovery results from the device Bluetooth low energy stack.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which.

DETAILED DESCRIPTION

Figure 1:
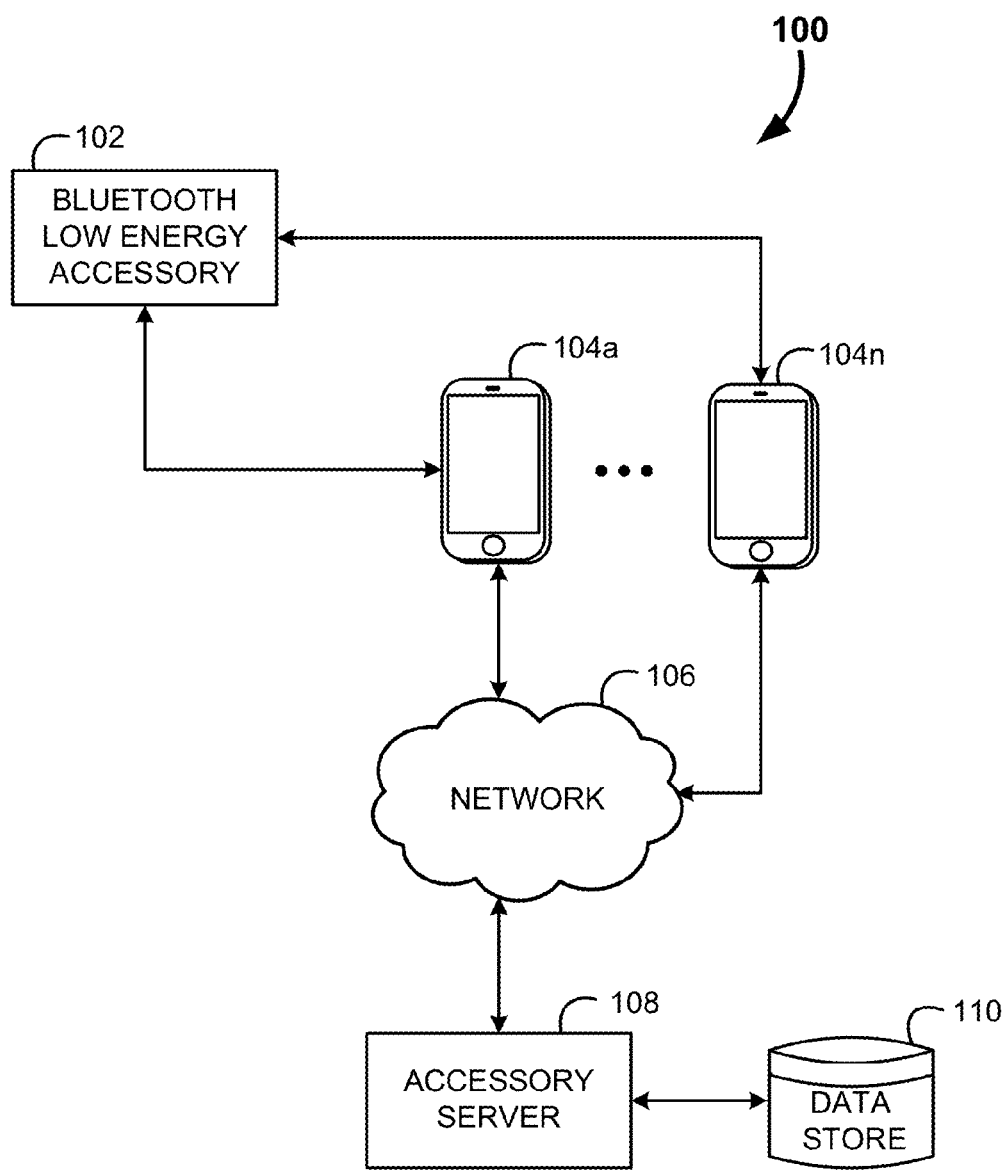
FIG. 1 is an example schematic block diagram for a system for short range wireless data transfers, in accordance with some embodiments.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well-known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The following discussion relates to methods and systems for short range wireless data transfers. Such systems and methods enable new classes of low cost, low energy accessories that have the ability to get firmware updates, or other data transfers while still complying with Bluetooth low energy (BLE) standards.

Bluetooth low energy is an international open standard for low power short range wireless communication. BLE enables low power devices that have extended battery life, and are thus ideally suited for small accessories where power availability is at a premium, such as wireless watches, proximity key fobs, fitness sensors, etc.

The ability to perform data transfers in the means described below enables firmware updates for BLE accessories. This ability enables the accessory manufacturer to fix bugs, solve interoperability problems, and improve product performance after the product has shipped. By enabling wireless data transfers, now physical connections are required, which minimizes costs associated with the accessory, and it is also easier for the user; in fact it can be done without the user's knowledge or interaction.

BLE accessory products often have other data transfer needs in addition to support for over-the-air firmware upgrades. For example, a fitness accessory may need to transfer a several kilobytes of data containing physical activity measurements to a phone. This is an example of a bulk data transfer of a finite length. Another example is an accelerometer sensor that constantly transfers a stream of accelerometer measurements to a phone. This is an example of a streaming data transfer that continues until the transfer is stopped. Currently disclosed systems and methods also enable these kinds of bulk and continuous data transfers, enabling greater functionality of BLE accessories.

As previously noted, the standard BLE communication protocols defined in the Bluetooth specification (which is herein incorporated by reference) are not necessarily designed for this sort of data transfer. Instead, they were designed for reading and writing small, discrete data values. As such, the currently disclosed systems and methods enable enhanced functionality over the standard protocols.

In addition to data transfers for firmware updates and bulk or continuous data transfers, other BLE accessory devices often have other communication protocol needs that require special solutions to improve performance and interoperability. Many accessories need special "device control" features. Examples of device control features include: configuring connection parameters, setting the connection security level, or disconnecting a connection. Likewise, as previously noted, there is a need for application layer authentication and encryption. The ability to supply these control features and authentication/encryption procedures is described in greater detail below.

The term "device" as used herein is intended to refer to any device to which a BLE accessory communicates with. Often these devices are also referred to as "mobile devices" as one focus of BLE accessory communication is with devices such as laptops, cell phones, and tablets. However, it should be understood that any device where communication to a BLE accessory is desired falls within the scope of the term "device".

Also note that the term "accessory" is utilized to describe the BLE enabled device which communicates with the cell phone, tablet, computer, etc. The term accessory is utilized, primarily, to differentiate the BLE end client from the device to which it communicates. As such, while "accessory" typically denotes a reliance or subsistence upon the main device, this is not entirely the case for the purposes of this disclosure. Rather an accessory, for purposes of this disclosure may refer to any device which employs BLE protocols and a radio to communicate with another device.

Note that the following disclosure includes a series of subsections. These subsections are not intended to limit the scope of the disclosure in any way, and are merely for the sake of clarity and ease of reading. As such, disclosure in one section may be equally applied to processes or descriptions of another section if and where applicable.

I. Short Range Wireless Communication Systems

To facilitate this discussion, FIG. 1 provides an example schematic block diagram for a system for short range wireless data transfers, shown generally at 100. In this example block diagram, a Bluetooth low energy (BLE) device is in communication with one or more devices 104a-n via a BLE wireless protocol. The Bluetooth low energy specification defines standard communications procedures for devices to send and receive data. The device 104a-n may include mobile devices such as cell phones and tablets, or other devices such as appliances, stationary computers, video game consoles, etc.

The device 104a-n connects to the BLE accessory 102. The device 104a-n is running an application which implements the application-level BLE communications protocol, defining the data sent between the device 104a-n and the accessory 102 for the particular application.

In a number of embodiments, the device 104a-n may also have connectivity to a larger network 106. This network may include a local area network or a broader wide area network. In some instances, the network 106 is a corporate network of the internet. In other cases the network 106 could include multiple networks in conjunction (for example, a cell phone network that connects to the internet).

The network 106 enables communication between the devices 104a-n and one or more accessory servers 108. The server 108 may include a database 110 that includes credential information, updates, etc. Often the server 108 may be hosted by, or on behalf, of the accessory manufacturer to enable firmware updates and enhanced post market control of the accessory 102. However, it is envisioned that the server 108 may alternatively be set up by an active community of users, or an interested third party.

Figure 2:
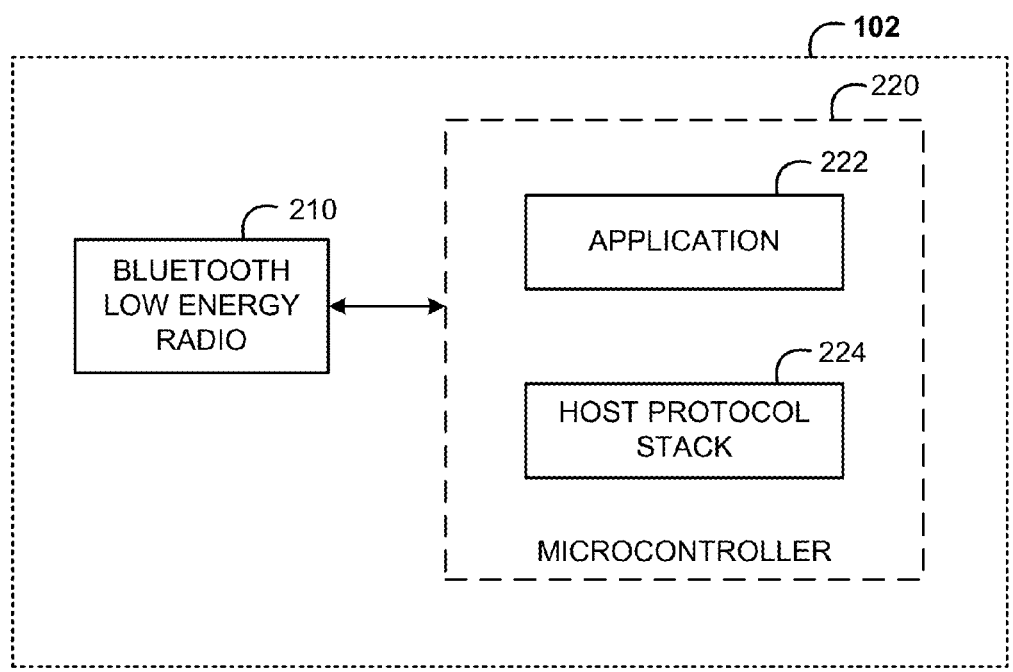
FIG. 2 is an example schematic block diagram for a more detailed view of components within the Bluetooth low energy accessory, in accordance with some embodiments.

Continuing to FIG. 2, an example schematic block diagram for a more detailed view of components within the Bluetooth low energy accessory 102 is provided. Here the accessory 102 is illustrated as having a BLE radio 210 in communication with a microcontroller 220. The microcontroller 220 executes host protocol stack firmware 224 and the BLE application 222.

Figure 3:
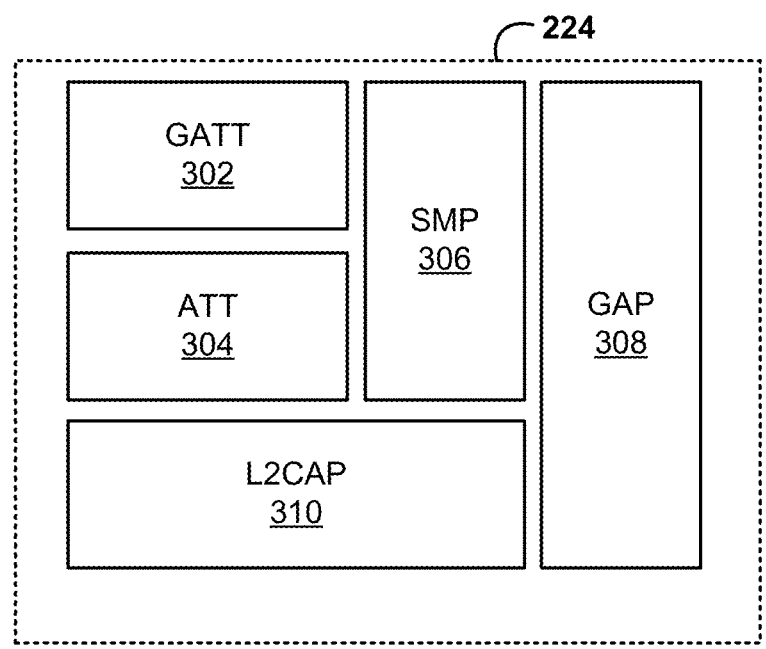
FIG. 3 is an example schematic block diagram for more detailed view of the host protocol stack within the Bluetooth low energy accessory, in accordance with some embodiments.

The Bluetooth specification defines a standard protocol stack used by BLE devices. An example protocol stack 224 is shown in FIG. 3. The stack 224 consists of the following standard protocol layers:

L2CAP 310: The Logical Link Control Adaptation Protocol provides channelization and multiplexing to the ATT and SMP protocols;

ATT 304: The Attribute Protocol provides procedures for finding, reading and writing discrete data values known as attributes. This is a client-server protocol with one device acting as client and the other as server;

SMP 306: The Security Manager Protocol provides procedures for bonding and establishing an encrypted connection;

GAP 308: The Generic Access Profiles provides procedures for device management, connection management, and security management;

GATT 302: The Generic Attribute Profile defines how attributes are grouped into characteristics and services in order to perform a specific application function.

When a BLE link connects two or more devices, the devices must operate in certain roles defined by the Bluetooth specification. In the example shown in FIG. 1, the device 104a-n operates as a Central device and the accessory 102 operates as a Peripheral device. The Central device initiates the connection and controls the connection timing. A Peripheral device broadcasts advertisements in order to accept a connection.

In addition to the Peripheral and Central connection roles, the devices also operate in certain protocol roles. One device must operate as an ATT and GATT server while the other device operates as an ATT and GATT client. In the example shown in FIG. 1, the devices 104a-n operates as an ATT and GATT client, accessing the ATT and GATT server on the accessory 102. Note that the connection roles and the client/server roles are independent; for example a device could be a Peripheral and client.

The two protocols most important to the systems and methods disclosed herein are ATT and GATT. ATT defines protocol messages for finding, reading, and writing attributes. The attributes are stored in a database in an ATT server. Each attribute has the following data elements associated with it:

A UUID that uniquely identifies the type of attribute;
Permissions that define whether the attribute can for example be read or written;
The attribute value.

The GATT layer provides another level of data abstraction. It groups attributes into data objects called characteristics. A characteristic is typically designed communicate a particular piece of data, for example a heart rate measurement. A characteristic consists of attributes containing the following information:

The characteristic properties;
The characteristic value;
Optionally, one or more characteristic descriptors.

Characteristics can be further grouped into a logical group called a service. A service is typically designed to perform a particular application function, for example a battery level service to communicate a device's battery level, or a heart rate service to configure and communicate a heart rate measurement.

II. Data Exchange Profile for Data Transfers

The following section provided details pertaining to the system architecture for the short range wireless data transfers central to this disclosure. Now, specifics of the mechanisms and protocols employed to achieve BLE data transfers will be explored. The data transfer utilized to effectuate firmware updates, bulk and continuous data transfers, application level authentication and encryption and device control features relies upon a novel protocol, referred herein as the Data Exchange (DX) Profile. A Data Exchange Service (DXS) is used by the DX Profile to implement the following functionalities:

Bulk file transfer;
Streaming data transfer;
Read, write, append, truncate, or erase a file;
Over-the-air (OTA) firmware upgrade;
Resume interrupted transfers;
Multiple simultaneous transfers;
Application layer authentication;
Session-based or file-based application layer encryption;
Device control features.

The DXS defines four different characteristics. These characteristics essentially operate as communications channels to transfer messages for their respective purposes. The four characteristics are provided below:

Device Control Characteristic. This characteristic is used to perform device control procedures, such as connection control.

File Transfer Control Characteristic. This characteristic is used for file transfer control messages.

File Transfer Data Characteristic. This characteristic is used for file transfer data.

Authentication Characteristic. This characteristic is used for authentication procedures, e.g. the Server can authenticate the Client.

Generally device control, authentication, and file transfer control employ GATT 302 protocols. File transfer data may rely upon either GATT 302 or L2CAP 310 protocols.

Implementing a file transfer over BLE poses a problem: Data transfer is traditionally performed over the ATT/GATT protocols, which were designed for transfer of small data values rather than bulk data transfer. Fast bulk data transfer can be implemented using a sequence of ATT Notification messages or ATT Write Command messages, which do not require per-packet acknowledgement at the ATT layer. However data flow can be difficult to manage between the sender and receiver; for example, some mobile phone operating systems do not perform well and may even drop data of a very long sequence of ATT Write Command messages are sent.

Another alternative is to transfer bulk data using the new L2CAP "connection oriented channels" protocol defined in the Bluetooth 4.1 specification. This can provide a channel for fast and robust data transfer, however it is not backward compatible with existing Bluetooth 4.0 devices. In fact operating systems like iOS 7.0 and Android 4.4 do not yet support this feature.

The file transfer control messages for a client is defined to get and put (read and write) data from/to a server. Additionally, separate channels for communicating file transfer control messages and file transfer data are defined. The client can specify the length of a "Get" or "Put" operation, which typically will be less than the total length of the file. Therefore a file transfer typically involves a sequence of Get or Put operations. Lastly, the client and server can negotiate the file transfer data to be sent over either GATT or L2CAP. This solution allows the client and server to balance throughput with interoperability by breaking up a file transfer into several shorter data transfers. It also can take advantage of devices supporting Bluetooth 4.1 L2CAP features while remaining backward compatible with Bluetooth 4.0 devices.

In addition, the file transfer protocol has unique features designed to support use cases for streaming data and over-the-air firmware upgrades. These features include a "file verify" operation, a "file type" parameter, and a "file resource" structure. The verify operation checks the CRC of the transferred file, in some embodiments. In alternate embodiments, other means for verification may be employed, such as checking cryptographic signature or the like. This is used to verify the complete and correct transfer of a file, such as a firmware file. The file type parameter distinguishes between streaming files and bulk files. Lastly, the file resource structure defines the handle, file type, length, permitted operations, name and version of each file.

Specific use cases of the data transfer functionalities described above will be discussed in greater detail in the following subsections.

A. Application Level Authentication

The authentication procedure performs application-layer authentication between an accessory 102 and device 104a-n, allowing the accessory 102 to authenticate the device 104a-n (or user via an application). The authentication algorithm, in some embodiments, is based on a shared secret key and may use AES-128 as a hash function. The authentication procedure requires a random number generator on the accessory 102 and an AES-128 (or other suitable hash function) implementation on the device 104a-n and accessory 102. In alternate embodiments, the authentication algorithm may also use public key cryptography to securely distribute a secret key between an accessory and device.

Application-layer authentication allows the accessory 102 to restrict access to certain features of the DX Profile only to authenticated devices 104a-n. The authentication procedure defines three levels of authentication: User, Maintenance, and Debug. Each level uses a different secret key. The Debug level uses a known fixed key.

One important benefit of application layer authentication is that it allows an accessory 102 to be authenticated to a user, via an application, rather than a device simply being authenticated to another device (e.g., a cell phone). This simplifies security for the user and aligns better with how users interact with their devices 104a-n: users typically have multiple cell phones or tablets and may run the same apps on them, which may connect to the same accessory devices 102.

Returning to FIG. 1 for reference, application level authentication involves the accessory 102 interfacing with an application on the device 104a-n. This application queries the server 108 via the network 106 to retrieve the user's account information which includes the accessory's 102 credentials. These credentials are used to authenticate the user to the accessory 102.

Figure 4:
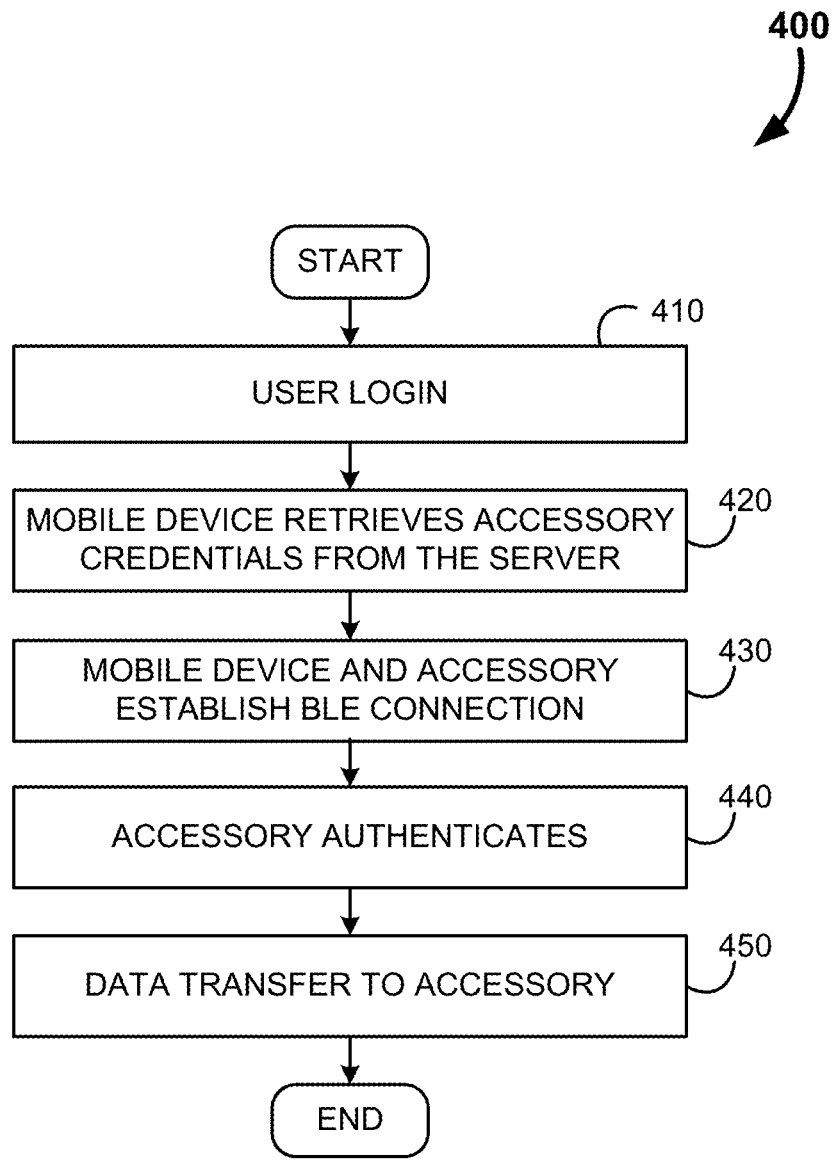
FIG. 4 is an example process flow diagram for application level authentication for short range wireless data transfers, in accordance with some embodiments.

Turning to FIG. 4, an example process flow diagram for authentication thereby enabling further short range wireless data transfers is provided. In this example process, the user logs into his account on the credential server using a username and password (or other suitable technique) via an application on the device 104a-n (at 410).

The application then retrieves credentials for accessories that have previously been associated with the user's account (at 420). Accessories 102 may be linked with the users account automatically at purchase, or via a product registration. The credentials include a unique device identifier such as a serial number and the authentication secret key.

A Bluetooth low energy connection is then established between the device 104a-n and the accessory 102 (at 430). This connection includes providing the unique identifier from the accessory 102 to the application on the device 104a-n. The unique identifier and key associated with the identifier is used to authenticate the accessory 102 (at 440) using the earlier received credentials. The authentication then allows for access to additional features, such as data transfers (at 450), or additional features.

Figure 12:
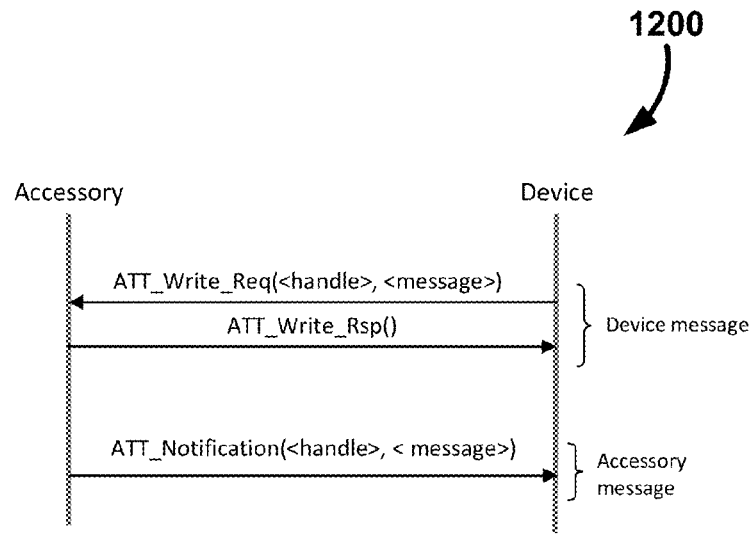

Moving to FIG. 12, an example diagram is provided, at 1200, for the ATT transport used for the authentication process. The authentication characteristic uses the ATT Write Request PDU to transport messages sent by the device 104a-n. The accessory 102 returns the status of an operation in the ATT Write Response or ATT Error Response sent in response to the ATT Write Request. The ATT Handle Value Notification PDU is used to transport messages sent by the accessory 102.

B. Firmware Update

As previously indicated, the DX Profile also enables for wireless firmware updates. Although existing over the air firmware update mechanisms already exist, the presently disclosed system and methods differ in their ability to allow the client to select the block size for file transfers by breaking up a file transfer into multiple file Put operations, the length of which is determined by the client (i.e. the iOS app). If the app knows it can only transfer 20 packets reliably before pausing, it can simply set the Put length accordingly. In addition, there is a handshake sequence at the end of each Put operation where the server sends a message to the client that the Put is complete. This eliminates the need for a timer; the client now knows the current Put is complete and can proceed with the next one.

Additionally, the currently disclosed firmware updating procedures have the following features not commonly found in existing over the air firmware updating mechanisms:
1. Files can be transferred from client to server (Put) and server to client (Get). Multiple simultaneous file transfers are possible.
2. Data transport is supported over GATT or L2CAP.
3. Data is transferred in a block size determined by the client. The completion of each Put transfer is acknowledged by the server.
4. Verification of the firmware and server device reset is controlled by the client. The client can verify a firmware file transfer without first resetting the server.
5. The protocol has an "enter diagnostic mode" command that can be sent from the client. This allows a server to better manage its resources and activities (e.g. stop reading the accelerometer and storing measurements when in diagnostic mode, etc.).
6. The server can refuse a Put or Get request from the client or abort a Put or Get operation in progress.
7. The protocol has a mechanism for the server to authenticate the client before a file transfer is initiated. The server can refuse file transfers if authentication is not successful. The authentication protocol is not intrinsically coupled to the file transfer protocol.

Figure 5:
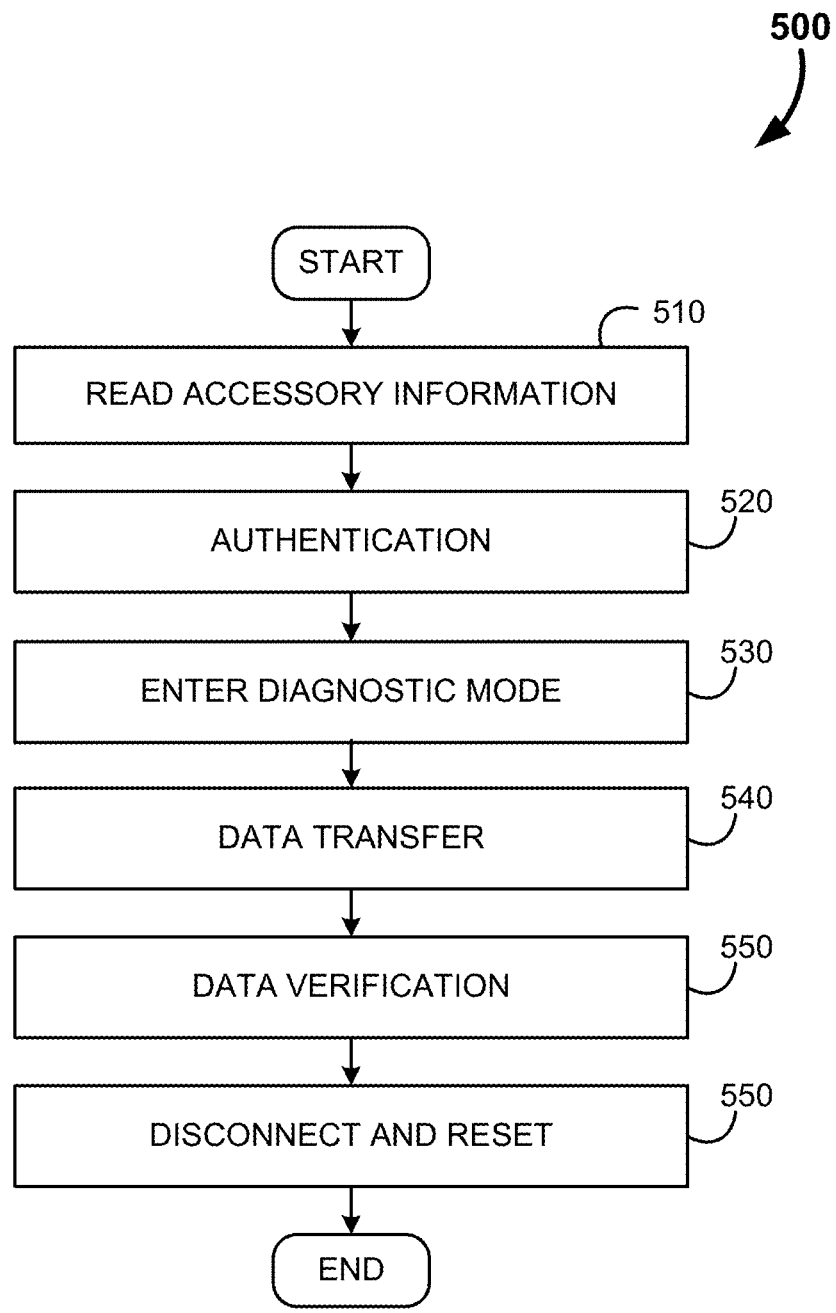
FIG. 5 is an example process flow diagram for a wireless firmware upgrade, in accordance with some embodiments.

FIG. 5 is an example process flow diagram for a wireless firmware upgrade, shown generally at 500. The firmware update utilizes a bulk file transfer from a firmware file from the device 104a-n to the accessory 102. The firmware update procedure begins with the device 104a-n reading the accessory 102 information (at 510). The information read typically includes device model and firmware revision using DXS device control functionality.

Next, the device 104a-n seeks authentication and an authentication procedure is performed (as previously discussed) using the DXS authentication characteristic (at 520). After the authentication is successfully performed, the device 104a-n sends the accessory 102 a message that causes the accessory 102 to enter into diagnostic mode (at 530). The DXS device control message is utilized to cause this diagnostic mode.

Next, the device 104a-n pushes the new firmware file to the accessory 102 using DXS file transfer (at 540), as discussed above. The device 104a-n requests the accessory 102 to verify the downloaded file (at 550) using the DXS file verification operation. Once the file has been verified, the device 104a-n sends a message to the accessory 102 to disconnect and reset (at 550). The disconnect and reset message is sent as a DXS device control message.

C. Device Control

In addition to bulk file transfer and firmware updates, the disclosed systems and methods include a number of device control capabilities that utilize the DXS. These include the ability to control parameter updates, determining packet size allowances, changing a security level, GATT service change notifications, deletion of bonds, and entering the accessory into diagnostic mode.

The Bluetooth specification defines several standard protocol procedures for things like connection management and security. However, popular operating systems like iOS and Android don't allow apps access to these standard Bluetooth LE procedures. These same procedures however can often be performed when initiated by the peer device connected to the iOS or Android phone. The purpose of the application-level device control procedures implemented over GATT are to allow a client (an app) on a feature-limited operating system to perform standard BLE procedures by instructing the peer device (accessory) to request the procedure.

FIGS. 6 to 9 provide sample flow charts for differing device control procedures. Each functionality will be described in greater detail in association with the corresponding figure.

Figure 6:
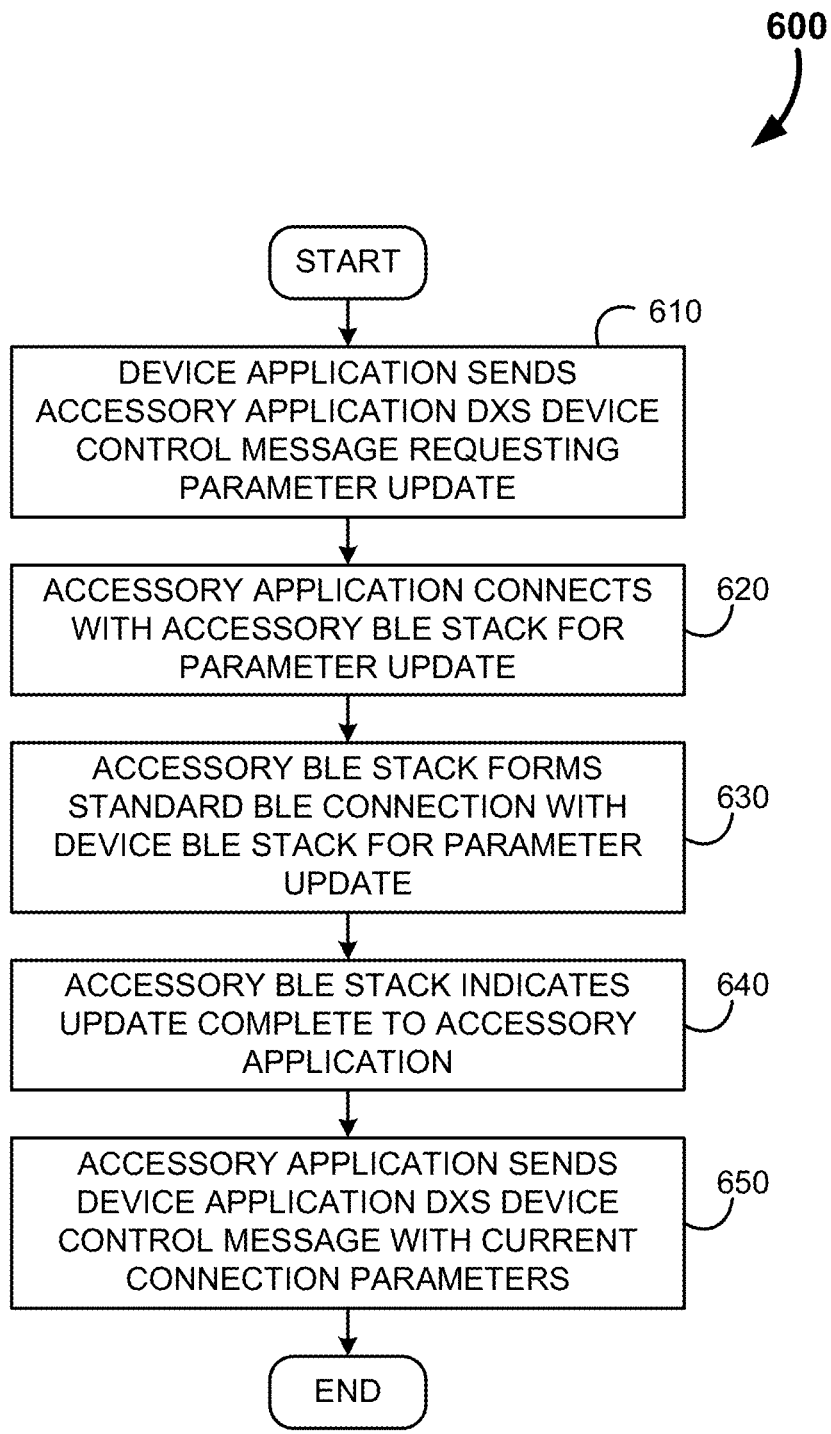
FIG. 6 is an example process flow diagram for a wireless parameter upgrade, in accordance with some embodiments.

FIG. 6 is an example communication diagram for a wireless parameter upgrade, shown generally at 600. This procedure updates the communication interval between devices in a connection; a short interval increases throughput, a long interval reduces power consumption. This process starts with the device application sending the accessory application a DXS device control message (at 610) requesting a parameter update. This causes the accessory application to connect with the accessory BLE stack for the parameter update (at 620).

The accessory BLE stack forms a standard BLE connection with the device BLE stack for parameter updating (at 630). The accessory BLE stack then indicates that the update is complete to the accessory application (at 640). The accessory application then sends the device application, using a DXS device control message, the current connection parameter information (at 650). In this manner, the parameters may be updates by the device application, essentially using the accessory as a proxy.

Figure 7:
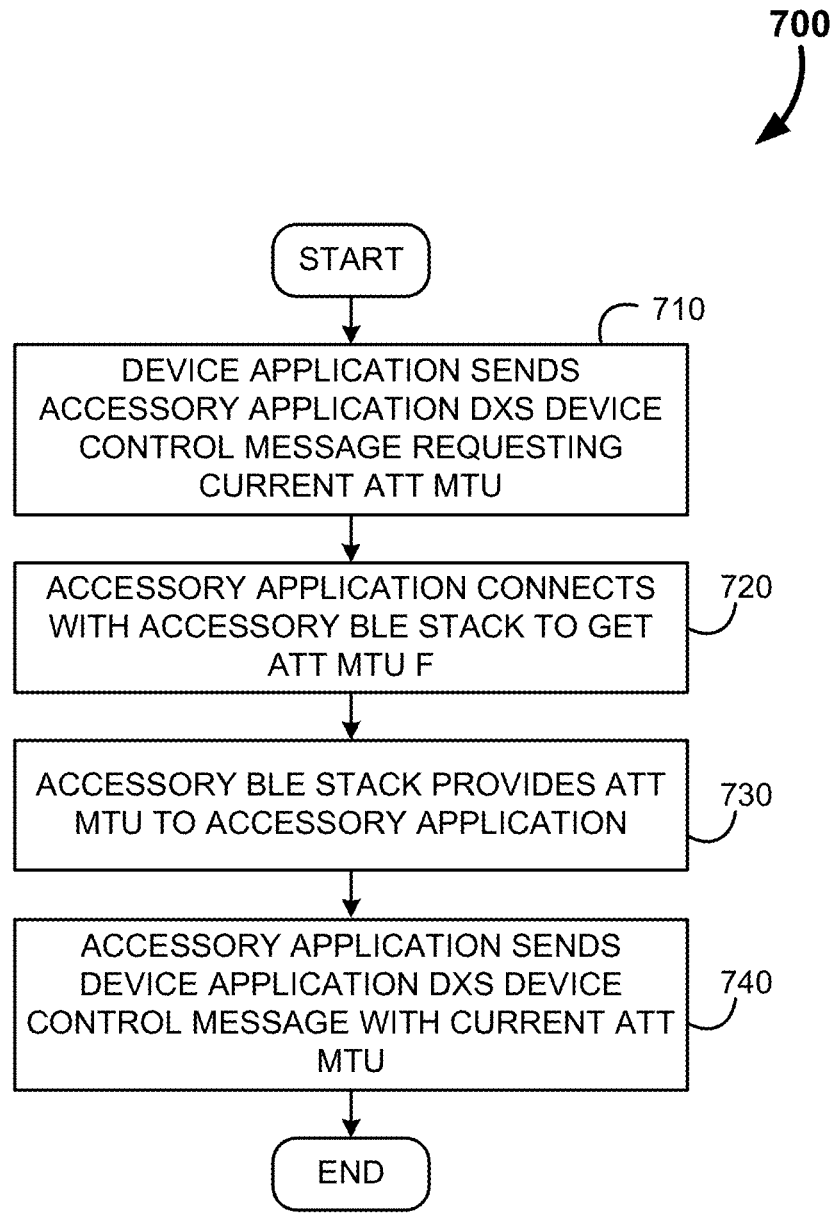
FIG. 7 is an example process flow diagram for determining the packet size that may be transmitted, in accordance with some embodiments.

FIG. 7 is an example process flow diagram for determining the packet size that may be transmitted, shown generally at 700. The ATT MTU value is used by the app to determine how large a packet it can send to an accessory device. This process starts with the device application sending the accessory application a DXS device control message (at 710) requesting the ATT MTU value. This causes the accessory application to connect with the accessory BLE stack (at 720).

The accessory BLE stack then provides the ATT MTU value to the accessory application (at 730). The accessory application then sends the device application, using a DXS device control message, the current ATT MTU information (at 740).

Figure 8:
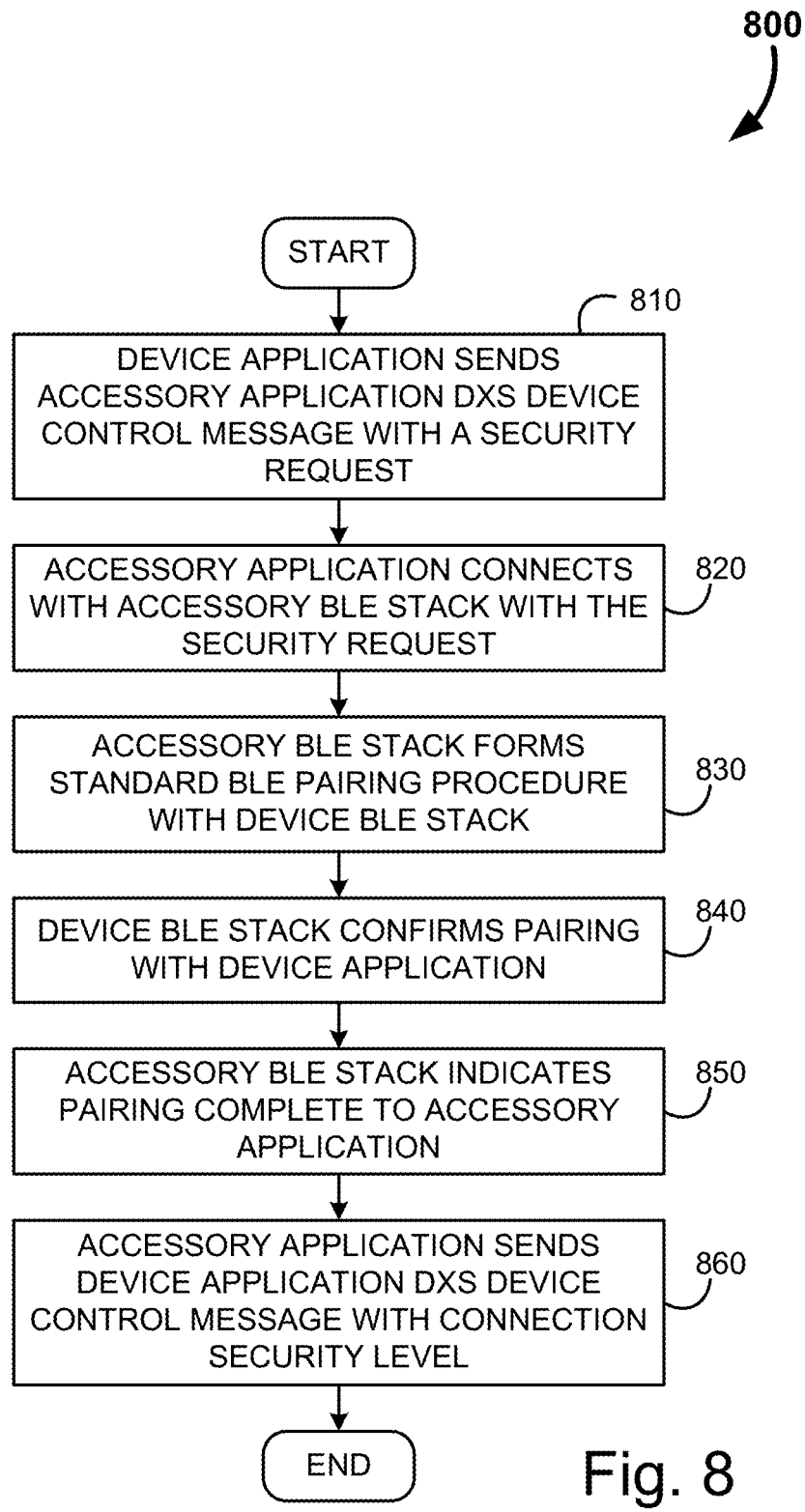
FIG. 8 is an example process flow diagram for changing a security level, in accordance with some embodiments.

FIG. 8 is an example process flow diagram for changing a security level, shown generally at 800. The security level of a connection indicates whether a connection is encrypted or unencrypted. The security level can be changed to request bonding and/or enable encryption. This process starts with the device application sending the accessory application a DXS device control message (at 810) with a security request. This causes the accessory application to connect with the accessory BLE stack for the security request (at 820).

The accessory BLE stack forms a standard BLE pairing procedure with the device BLE stack (at 830). The device BLE stack confirms the pairing with the device application (at 840), and then the accessory BLE stack then indicates that the pairing is complete to the accessory application (at 850). The accessory application then sends the device application, using a DXS device control message, the connection security level (at 860).

Figure 9:
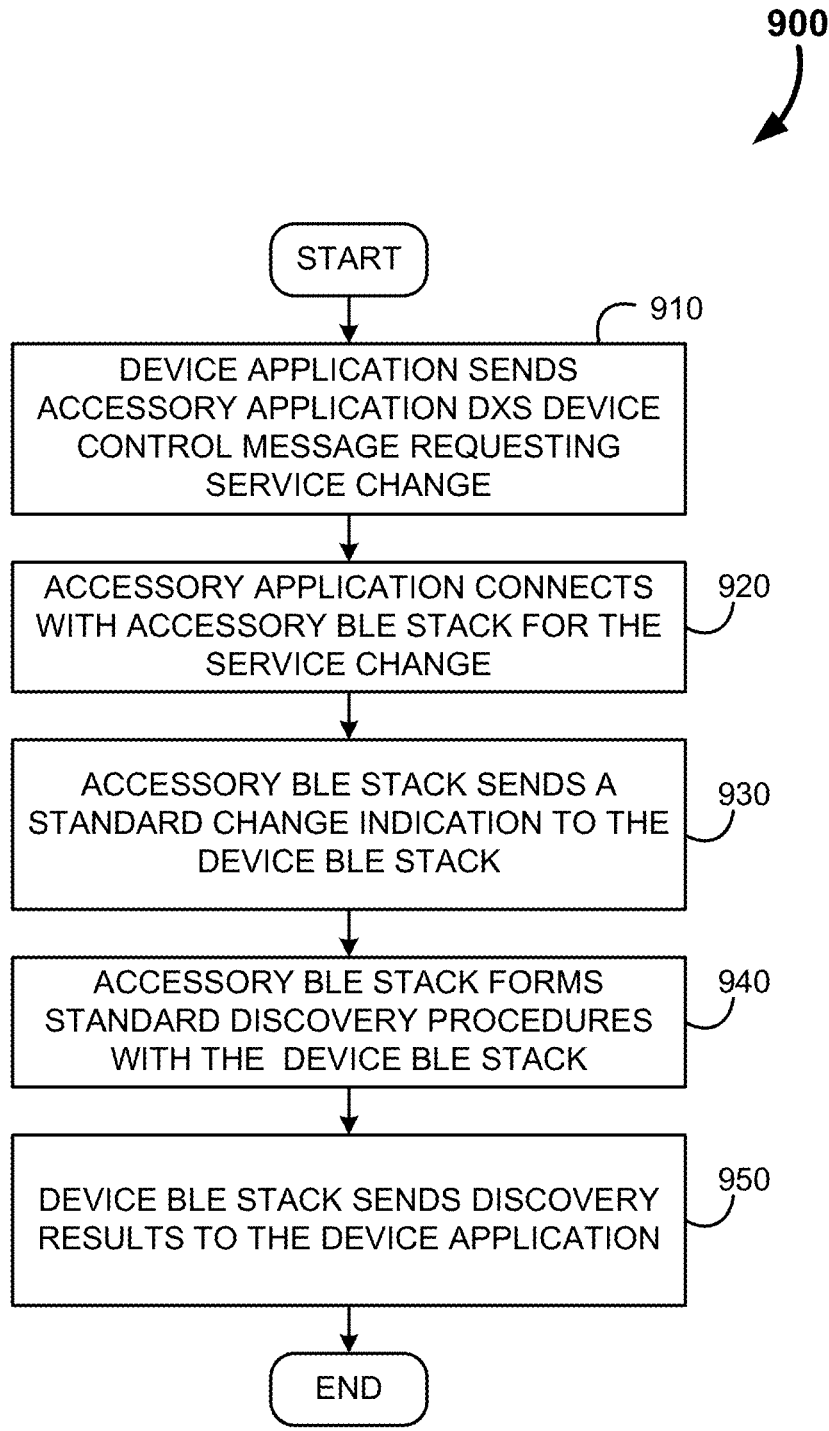
FIG. 9 is an example process flow diagram for notifying the GATT client that the services have changed on a GATT server, in accordance with some embodiments.

FIG. 9 is an example process flow diagram for notifying the GATT client that the services have changed on a GATT server, shown generally at 900. This is a mechanism to notify a GATT client that the services have changed on a GATT server, and the client needs to discover services and characteristics again. This process starts with the device application sending the accessory application a DXS device control message (at 910) requesting service change. This causes the accessory application to connect with the accessory BLE stack for the service change (at 920).

The accessory BLE stack sends a standard change indication to the device BLE stack (at 930). The accessory BLE stack then forms standard discovery procedures with the device BLE stack (at 940). The device BLE stack then sends discovery results to the device application (at 950).

In addition to the above identified device control features, additional procedures that are not standardized by the Bluetooth specification may be effectuated using the DX profile. These include bond deletion and entry to diagnostic mode. The deleting bond procedure allows an application to delete the bonds stored on an accessory. This is useful when the accessory has no user interface to perform this function. When deleting bonds the client sends a device control message instructing the server to delete all bonds. The server deletes all bonds. Note it is important for the server to authenticate the client (using the methods described earlier) before accepting this message. If an untrusted device is permitted to connect to a server and delete all its bonds it opens up a potential security hole whereby an attacker could force a server to re-bond then eavesdrop on the bonding protocol transaction and attempt to brute force crack the security key.

Likewise, the 'enter into diagnostic mode procedure' instructs the accessory to enter diagnostic mode. Typically this will shut down normal operation of the accessory (e.g. stop measuring heart rate, activity, etc.) and is performed before a firmware upgrade. When entering diagnostic mode the client sends a device control message instructing the server enter diagnostic mode. The server ceases performing certain normal operations, e.g. stops reading accelerometer data. Then the server send a diagnostic mode complete message to the client.

III. Examples

Figure 10:
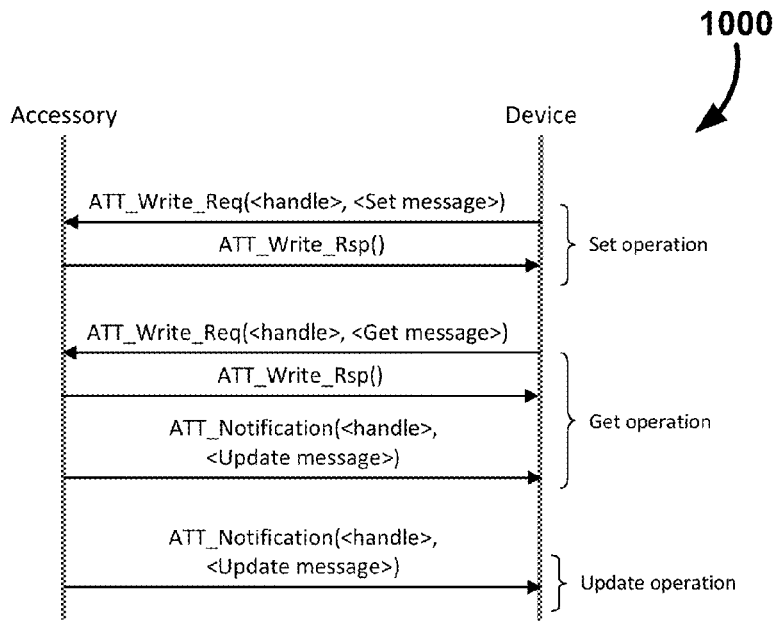
FIGS. 10-15 are example operation diagrams for operation and data transfers between device and a BLE accessory, in accordance with some embodiments.

Now that the systems and methods for firmware updates, file transfers and device controls has been described in considerable detail, a series of example communications are provided in reference to FIGS. 10-15 which are employed to effectuate the above methods. For example, FIG. 10 provides examples of a set operation, a get operation and an update operation, shown generally at 1000.

The device control characteristic uses the ATT write request PDU to transport Get and Set messages sent by the client. The server returns the status of a Get or Set message in the ATT write response or ATT error response PDU. The ATT handle value notification PDU is used to transport update messages sent by the server.

A Set operation consists of an ATT write request followed by an ATT write response or ATT error response. A Get operation consists of ATT write request followed by an ATT write response, then followed by a handle value notification with an update message containing the result of the Get operation. Note that an update message serves two purposes: First, it is used to return the result of a Get message. Second, it is used to asynchronously send parameter data from the server to the client.

Figure 11:
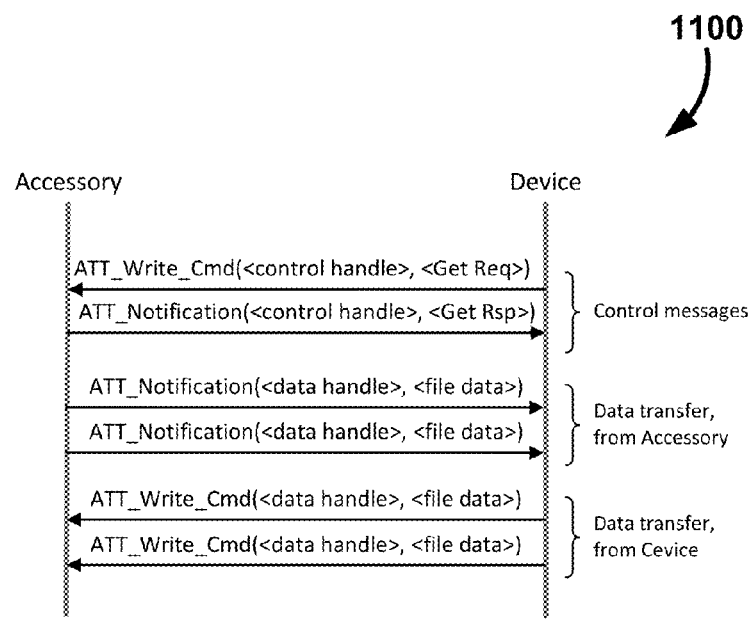

FIG. 11 illustrates ATT transport operations, including control messaging, and data transfers between the accessory and device, shown generally at 1100. On the file control characteristic, the ATT write command PDU is used by the client to send file control messages. The ATT handle value notification PDU is used by the server to send file control messages. Likewise, on the file data characteristic, the ATT write command PDU is used by the client to send file data, and ATT handle value notification PDU is used by the Server to send file data.

FIG. 12 illustrates the usage of ATT transport for authentication characteristics, shown generally at 1200. The authentication characteristic uses the ATT write request PDU to transport messages sent by the client. The server returns the status of an operation in the ATT write response or ATT error response sent in response to the ATT write request. The ATT handle value notification PDU is used to transport messages sent by the server.

Figure 13:
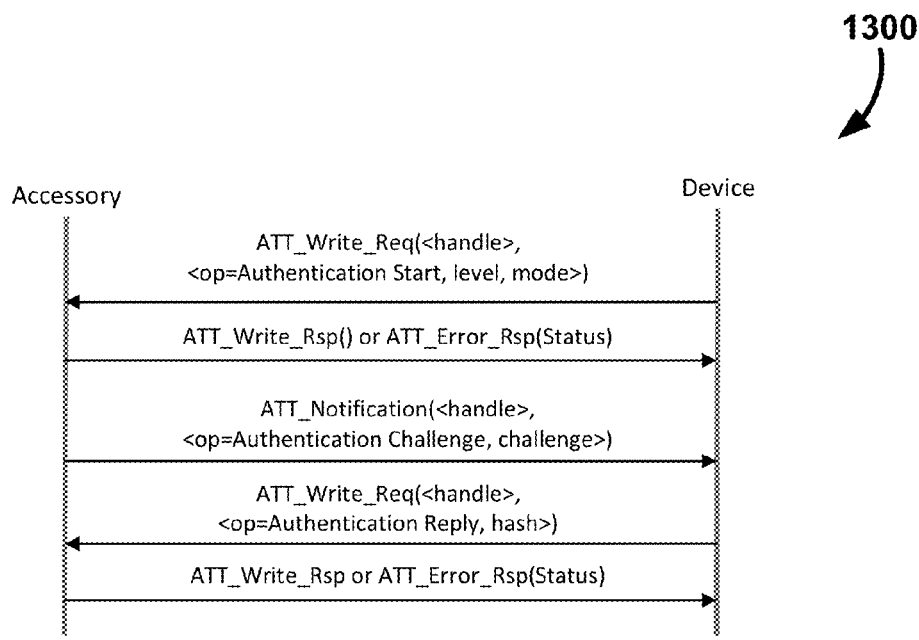

An example of the authentication procedure is illustrated in FIG. 13, shown generally at 1300. The client sends an authentication start with the desired authentication level. The server sends an ATT write response or an ATT error response. The server generates a random number and sends an authentication challenge. The client computes a hash and sends an authentication reply. The server also computes the hash, and compares it to that received from the client. Then the server sends an ATT write response or ATT error response. If the authentication was successful, the client computes a session key. The client sets the authentication level for the connection and also computes the session key. The authentication level is maintained until the connection is closed or until the authentication level is set again by another successful authentication procedure.

Figure 14:
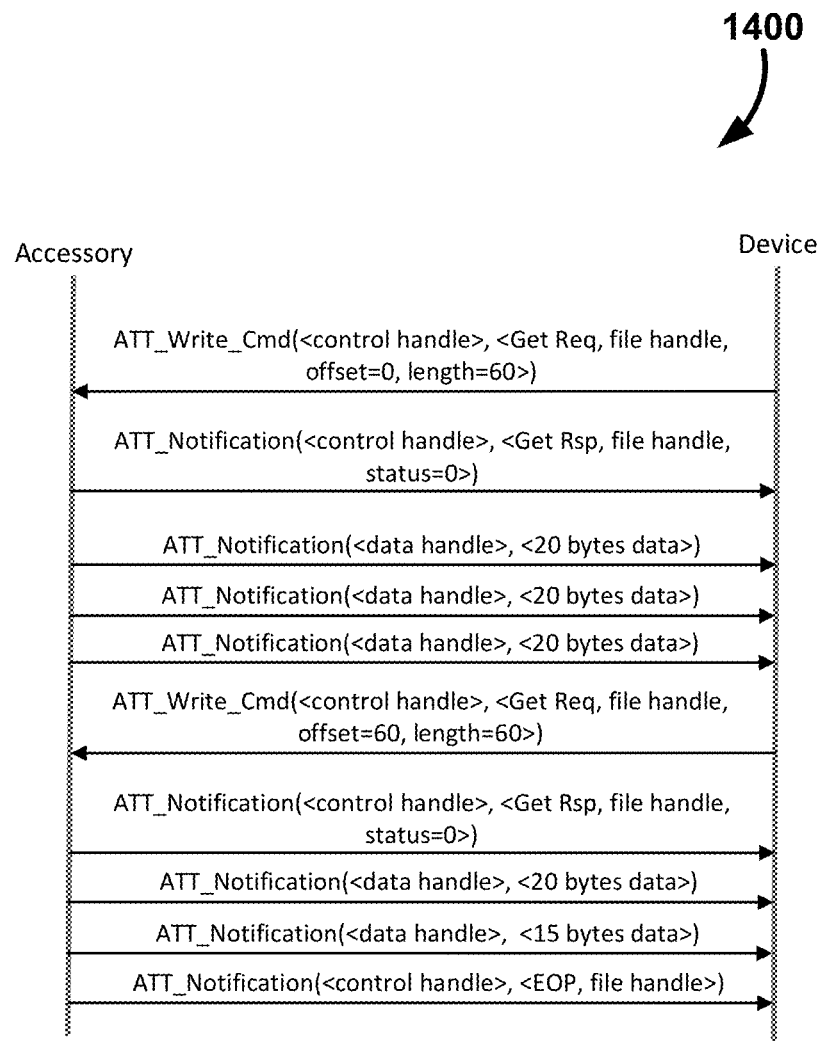

Continuing, FIG. 14 provides an example of a bulk file transfer, shown generally at 1400. Bulk file transfer may also be performed with a resume if it has an interruption (not illustrated). If a bulk file transfer is interrupted, upon reconnecting, the Client resumes the file transfer using the offset to get the next data that had not been received.

Figure 15:
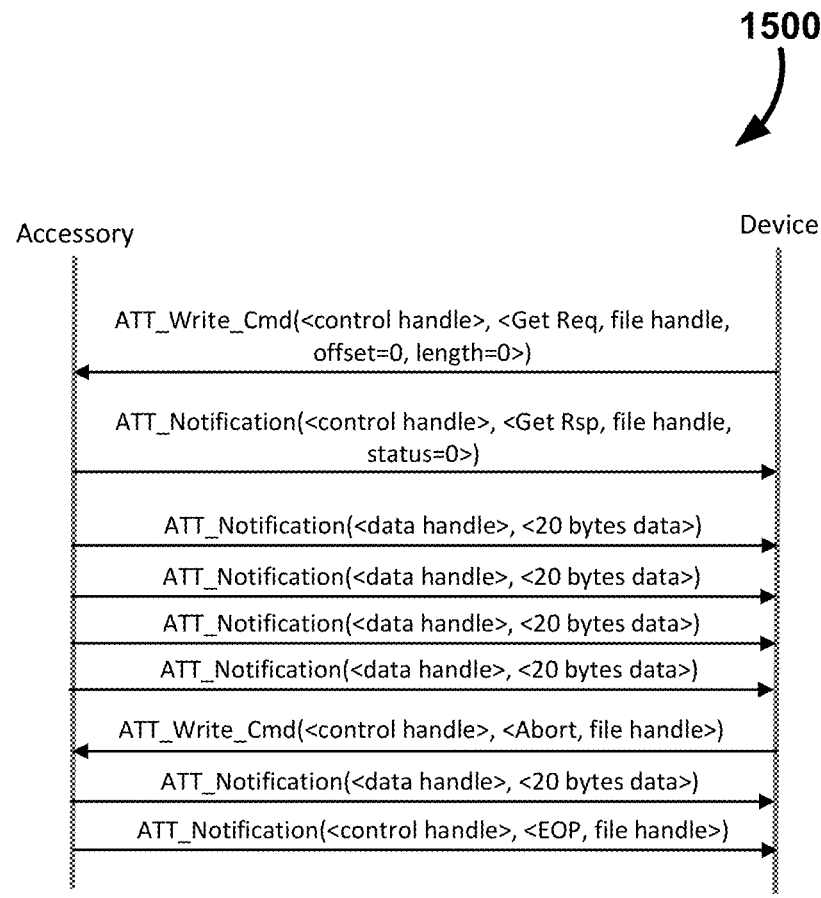

Likewise, FIG. 15 provides for streaming file transfer, shown generally at 1500. In this example, the server contains a streaming file. The client gets the file and then later sends an abort to stop streaming of the file. Note that the client can receive some file data after sending an abort. The server sends an EOP when it has stopped sending data.

As can be imagined, numerous other examples and permutations of the disclosed firmware updates, file transfers, and device commands are possible, but have been omitted from the present disclosure in the interest of clarity and brevity. Although not all of the above disclosed functionalities have been exemplified using an example operation diagram, it should be understood that these operations are still within the intended scope of the invention.

In sum, the present disclosure provides systems and methods for short range wireless data transfers. Such systems and methods enable new classes of low cost, low energy accessories that have the ability to get firmware updates, or other data transfers while still complying with Bluetooth low energy (BLE) standards.

While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention.

It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for authenticated data transfer between a low energy short range wireless device and an accessory associated with a user of the accessory, the method comprising:
   establishing a network connection between the low energy short range wireless device and a server;
   accessing account information associated with the user, where the account information is stored in a database accessible by the server, the account information including accessory credentials;
   receiving, by the low energy short range wireless device, the accessory credentials from the server via the network connection;
   establishing a short range wireless low energy connection between the low energy short range wireless device and the accessory;
   authenticating with the accessory using the accessory credentials of the user account information;
   transferring data from the low energy short range wireless device to the accessory after authenticating with the accessory; and
   the low energy short range wireless device:
      requesting the accessory to verify the transferred data; and
      sending a message to the accessory to disconnect from the low energy short range wireless device and reset, where the accessory credentials comprise a device identifier of the accessory and an authentication key.

2. The method of claim 1, wherein an application on the device receives the accessory credentials and authenticates with the accessory without the device operating system's involvement.

3. The method of claim 1, further comprising defining a file transfer control message for the device to get and put data from and to the accessory.

4. The method of claim 3, further comprising defining separate channels for communicating file transfer control messages and transfer data.

5. The method of claim 3, further comprising specifying the length of a get or put operation.

6. The method of claim 1, wherein the transferring data is a streaming transfer.

7. The method of claim 6, further comprising the low energy short range wireless device requesting the accessory to verify the transferred data for completion and correctness.

8. The method of claim 1, wherein the authenticating is an application layer authentication between the device and the accessory using a shared secret key and using a hash function.

* * * * *